US011262908B2

(12) United States Patent
Yoo

(10) Patent No.: US 11,262,908 B2
(45) Date of Patent: *Mar. 1, 2022

(54) METHOD OF ADJUSTING AN UI AND USER TERMINAL USING THE SAME

(71) Applicant: Arability IP LLC, Austin, TX (US)

(72) Inventor: Chang-Sik Yoo, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,630

(22) Filed: May 6, 2019

(65) Prior Publication Data

US 2019/0258379 A1 Aug. 22, 2019

Related U.S. Application Data

(63) Continuation of application No. 15/600,515, filed on May 19, 2017, now Pat. No. 10,331,332, which is a continuation of application No. 14/125,543, filed as application No. PCT/KR2013/005123 on Jun. 11, 2013, now Pat. No. 9,703,470.

(30) Foreign Application Priority Data

Jun. 28, 2012 (KR) .................. 10-2012-0070194
Jul. 27, 2012 (KR) .................. 10-2012-0082500

(51) Int. Cl.
| G06F 3/048 | (2013.01) |
| G06F 3/0488 | (2022.01) |
| G06F 3/04883 | (2022.01) |
| G06F 3/0484 | (2022.01) |
| G06F 3/14 | (2006.01) |
| G06F 3/04817 | (2022.01) |
| G06F 3/0482 | (2013.01) |

(Continued)

(52) U.S. Cl.
CPC .......... *G06F 3/0488* (2013.01); *G06F 3/0482* (2013.01); *G06F 3/0484* (2013.01); *G06F 3/04817* (2013.01); *G06F 3/04842* (2013.01); *G06F 3/04883* (2013.01); *G06F 3/14* (2013.01); *G06F 2203/04803* (2013.01); *G06F 2203/04806* (2013.01)

(58) Field of Classification Search
CPC .. G06F 3/0488; G06F 3/04817; G06F 3/0482; G06F 3/0484
See application file for complete search history.

(56) References Cited

U.S. PATENT DOCUMENTS 6,075,531 A * 6/2000 DeStefano .......... G06F 3/04812
715/788
8,239,784 B2 * 8/2012 Hotelling ............ G06F 3/04883
715/830

(Continued)

FOREIGN PATENT DOCUMENTS

CN 101158889 A 4/2008
CN 102479041 A 5/2012

(Continued)

*Primary Examiner* — Nicholas Augustine
(74) *Attorney, Agent, or Firm* — Eugenio J. Torres-Oyola; Victor M. Rodriguez-Reyes; Rafael Rodriguez-Muriel

(57) ABSTRACT

A method of adjusting the size, position, or arrangement of a UI and a user terminal using the method are disclosed. The user terminal includes a display unit for displaying a UI, and a UI control unit configured to display the UI on the display unit with at least one of a position, size, and arrangement of the UI adjusted according to an input by a user.

20 Claims, 22 Drawing Sheets

(51) Int. Cl.
*G06F 3/04842* (2022.01)
*G06F 3/01* (2006.01)

(56) References Cited

U.S. PATENT DOCUMENTS

| | | | | |
|---|---|---|---|---|
| 8,856,690 | B2 * | 10/2014 | Reeves | G06F 3/04883 |
| | | | | 715/863 |
| 8,982,072 | B2 | 3/2015 | Sim et al. | |
| 9,046,992 | B2 * | 6/2015 | Sirpal | G06F 3/017 |
| 9,158,445 | B2 * | 10/2015 | Wong | G06F 3/04845 |
| 9,483,160 | B2 * | 11/2016 | Jung | G06F 3/04817 |
| 2004/0165010 | A1 * | 8/2004 | Robertson | G06F 3/0481 |
| | | | | 715/805 |
| 2007/0288863 | A1 * | 12/2007 | Ording | G06F 3/04847 |
| | | | | 715/788 |
| 2009/0167714 | A1 * | 7/2009 | Kao | G06F 3/0488 |
| | | | | 345/173 |
| 2010/0156806 | A1 * | 6/2010 | Stallings | G06F 3/04883 |
| | | | | 345/173 |
| 2010/0277506 | A1 | 11/2010 | Yao | |
| 2011/0109581 | A1 | 5/2011 | Ozawa et al. | |
| 2011/0193809 | A1 | 8/2011 | Walley et al. | |
| 2011/0298830 | A1 * | 12/2011 | Lam | G06F 3/04883 |
| | | | | 345/661 |
| 2012/0071149 | A1 | 3/2012 | Ban Dyopadhyay et al. | |
| 2012/0096393 | A1 | 4/2012 | Shim et al. | |
| 2013/0100036 | A1 * | 4/2013 | Papakipos | G06F 3/04842 |
| | | | | 345/173 |
| 2013/0127738 | A1 * | 5/2013 | Miller | G06F 3/03547 |
| | | | | 345/173 |
| 2013/0285933 | A1 | 10/2013 | Sim et al. | |

FOREIGN PATENT DOCUMENTS

| | | | | |
|---|---|---|---|---|
| EP | 1923778 | A2 * | 5/2008 | ........ H04M 1/72544 |
| JP | 2007-264923 | A | 10/2007 | |
| JP | 2011-159077 | A | 8/2011 | |
| JP | 2011-221833 | A | 11/2011 | |
| KR | 10-2009-0126686 | A | 12/2009 | |
| KR | 10-2010-0055663 | A | 5/2010 | |
| KR | 10-2010-0083268 | A | 7/2010 | |
| KR | 10-2010-0089376 | A | 8/2010 | |
| KR | 10-2010-0092613 | A | 8/2010 | |
| KR | 10-2010-0115431 | A | 10/2010 | |
| KR | 10-2011-0016108 | A | 2/2011 | |
| KR | 20110018589 | A | 2/2011 | |
| KR | 10-1056088 | B | 8/2011 | |
| KR | 10-2011-0111000 | A | 10/2011 | |
| KR | 10-2012-0024299 | A | 3/2012 | |
| KR | 10-2012-0034827 | A | 4/2012 | |
| KR | 10-2012-0079266 | A | 7/2012 | |
| KR | 10-2013-0103010 | A | 9/2013 | |

\* cited by examiner

METHOD OF ADJUSTING AN UI AND USER TERMINAL USING THE SAME

CROSS-REFERENCE TO RELATED APPLICATIONS

This application is a continuation of U.S. patent application Ser. No. 15/600,515, which was filed on May 19, 2017, which is a continuation of U.S. patent application Ser. No. 14/125,543, which was filed on Dec. 11, 2013, which is a National Stage Entry of PCT International Application No. PCT/KR2013/005123, which was filed on Jun. 11, 2013, and which claims priority from Korean Patent Application No. 10-2012-0070194 filed with the Korean Intellectual Property Office on Jun. 28, 2012, and Korean Patent Application No. 10-2012-0082500, filed with the Korean Intellectual Property Office on Jul. 27, 2012. The disclosures of the above patent applications are incorporated herein by reference in their entirety.

BACKGROUND

1. Technical Field

The present invention relates to a method of adjusting a UI and to a user terminal using the method.

2. Description of the Related Art

In recent times, the display size of the smart phone has gradually increased, as seen on the Galaxy Note and the Optimus Vu, making it easier to view video clips, etc., but more difficult to manipulate a smart phone with one hand. When manipulating a smart phone with one hand, the thumb is used in most cases, but since the thumb is shorter compared to the other fingers, manipulation becomes even more difficult.

SUMMARY

An aspect of the present invention is to provide a method of adjusting the size, position, or arrangement of a UI and a user terminal that employs such method.

To achieve the objective above, an embodiment of the present invention provides a user terminal that includes a display unit for displaying a UI, and a UI control unit configured to display the UI on the display unit with at least one of a position, size, and arrangement of the UI adjusted according to an input by a user.

An embodiment of the present invention provides a method of adjusting a UI on a user terminal that includes displaying a first UI on a display unit; and displaying a second UI on the display unit. Here, the second UI has the same function as the first UI but has a different position, size, or arrangement.

An embodiment of the present invention provides a recorded medium which is readable by a digital processing device, and which tangibly embodies a program of instructions executable by the digital processing device to perform a method for adjusting a UI on a user terminal, where the method includes displaying a first UI on a display unit; and displaying a second UI on the display unit. Here, the second UI has the same function as the first UI but has a different position, size, or arrangement.

A method of adjusting a UI and a user terminal that uses the method according to certain embodiments of the present invention enables the user to adjust the position, size, or arrangement of the UI for convenient use, so that the user can easily manipulate a user terminal, especially a smart phone, even with one hand.

Additional aspects and advantages of the present invention will be set forth in part in the description which follows, and in part will be obvious from the description, or may be learned by practice of the present invention.

[Description of Reference Numerals]

| | |
|---|---|
| 100: UI | 102: pattern |
| 200, 202: adjustment area | 700: UI |
| 702: adjustment icon | 800: menu |
| 810: first sub-menu | 812: second sub-menu |
| 900: adjustment bar | 910: position adjustment bar |
| 912: size adjustment bar | 1100: UI |
| 1200: adjustment unit | 1300: adjustment icon |
| 1400, 1500, 1502: UI | |

DETAILED DESCRIPTION

Certain embodiments of the present invention will be described below in more detail with reference to the accompanying drawings.

A user terminal based on an embodiment of the present invention, such as a smart phone, can easily adjust the size, position, rotation, etc., of a displayed UI (User Interface). In particular, embodiments of the present invention may provide various methods of adjusting a UI by to easily manipulate a UI displayed on the user terminal with one hand. Here, the UI encompasses all types of UI such as entities (interfaces, widgets, icons, patterns, etc.), pattern unlock screens, widget screens shown after an unlock, regular UI screens, etc., and can also mean a partial UI from among a whole UI displayed on a screen. The UI can correspond to the size of the screen on which the UI is displayed.

Certain embodiments of the present invention will be described below in more detail with reference to the accompanying drawings.

FIG. 1A, FIG. 1B, FIG. 1C, and FIG. 1D illustrate a method of adjusting a UI according to an embodiment of the present invention. For easier description, the method of adjusting a UI will be described using the pattern unlock as an example of a UI.

Figure 1A:
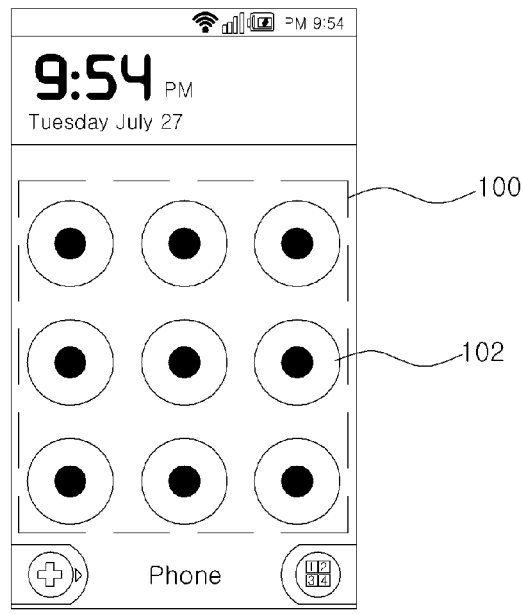
FIG. 1A, FIG. 1B, FIG. 1C, and FIG. 1D illustrate a method of adjusting a UI according to an embodiment of the present invention.

Referring to FIG. 1A, the unlock patterns 102 for a pattern unlock can be defined as one UI 100, and the UI 100 may be displayed on the screen of a user terminal, such as a smart phone for example. The screen can be divided into an area for displaying the UI, a top area for displaying the remaining battery power, etc., and a bottom area for displaying the phone icon, etc., as shown in FIGS. 1A to 1D.

When the UI 100 is displayed in a large size as illustrated in FIG. 1A, the user may have to use both hands to control the user terminal conveniently, but when only one hand is available for using the user terminal, such as on a bus, or a subway train, etc., it can be difficult to control the user terminal.

Figure 1B:
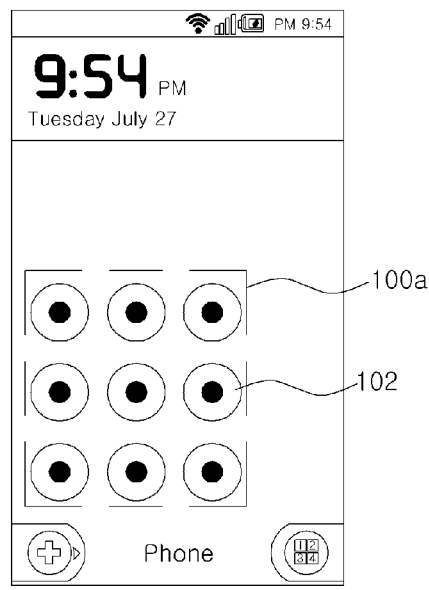
Figure 1C:
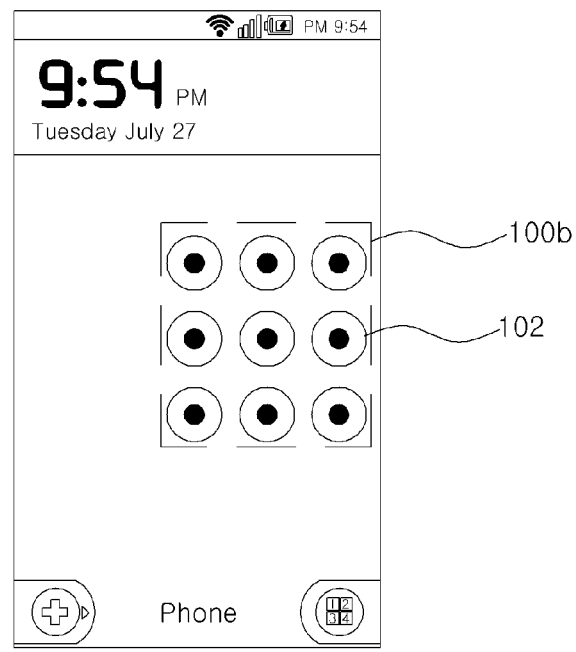
Figure 1D:
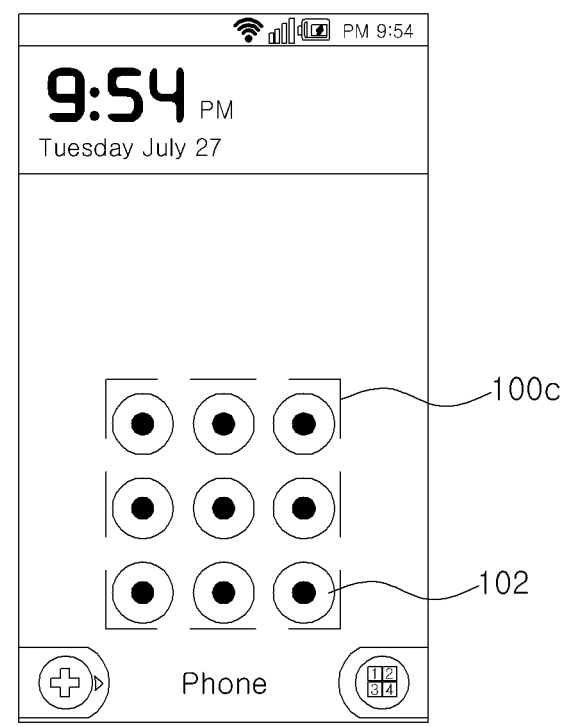

Thus, a method of adjusting the UI based on an embodiment of the present invention may adjust the size, position, etc., of the UI 100 according to an input by the user, as illustrated in FIG. 1B to FIG. 1D. Of course, the UI adjustment method can involve reducing the UI to generate a reduced UI 100a, 100b, and 100c, and magnifying a reduced UI 100a, 100b, and 100c or returning it to its original size. Here, the rate of magnification and rate of reduction can be varied according to the user's input or can be fixed to preset values.

The UI 100a, 100b, or 100c can be arranged in various positions, as illustrated in FIGS. 1B to 1D. However, assuming that the user touches the user terminal with one hand, it may be preferable to position the reduced-size UI 100a, 100b, or 100c on the left or right side of the screen.

According to an embodiment of the present invention, the user input is a concept that encompasses both user inputs made as a user touches the screen of the user terminal and user inputs made as a user brings a touch means, such as a finger, etc., near to the user terminal without actually touching the screen of the user terminal. For easier description, it will be assumed below that the user input is an input made when the user touches the screen of the user terminal or touches a keypad, etc., of the user terminal.

A description is provided below, with reference to the accompanying drawings, of various methods for adjusting a UI according to certain embodiments of the present invention.

Figure 2:
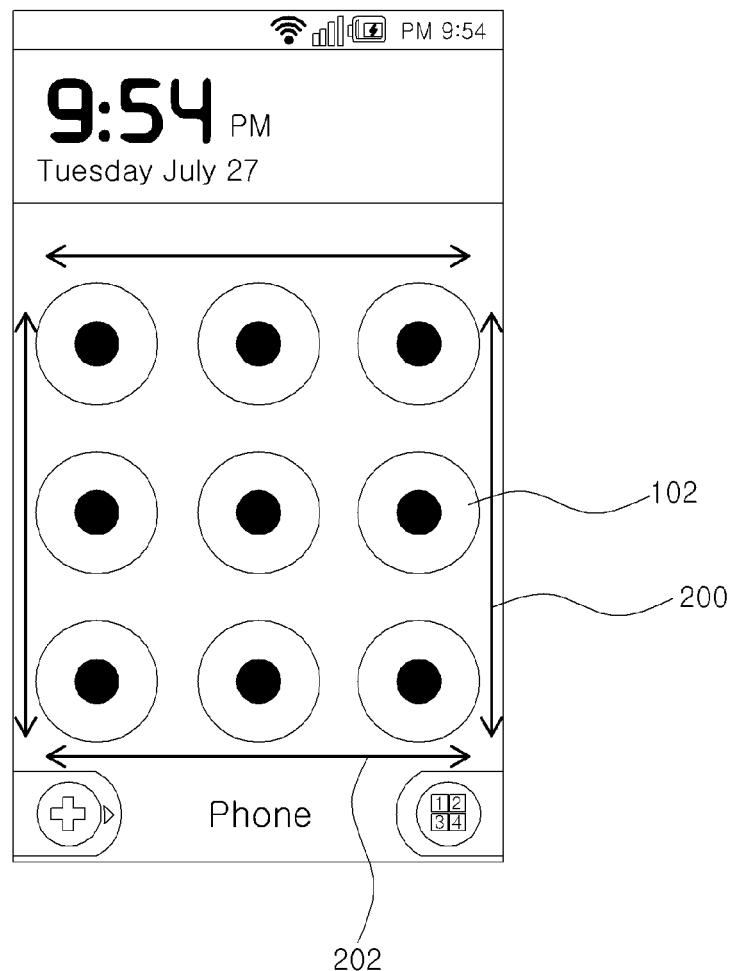
FIG. 2, FIG. 3, FIG. 4, FIG. 5, and FIG. 6 illustrate a method of adjusting a UI according to a first embodiment of the present invention.

FIG. 2, FIG. 3, FIG. 4, FIG. 5, and FIG. 6 illustrate a method of adjusting a UI according to a first embodiment of the present invention. For easier description, the UI adjustment method will be described using the pattern unlock as an example of a UI. Referring to FIG. 2, there can be left and right adjustment areas 200 and upper and lower adjustment areas 202 for adjusting the size and position of the UI. More specifically, the adjustment areas 200 and 202 can be positioned in perimeter portions of the UI, and can be positioned within a preset distance from the bezel of the user terminal. The adjustment areas 200 and 202 can be actually represented on the screen, such as by arrows as illustrated in FIG. 2, or can be virtual areas that are not represented by arrows.

Although FIG. 2 represents the adjustment areas 200 and 202 as arrows, they can be represented in other forms. For example, entities similar to a UI for zoom adjustment on a camera can be shown in the adjustment areas 200 and 202. Also, the adjustment areas 200 and 202 can preferably be positioned in areas other than the area in which entities such as icons, etc., are represented, and can be areas along the entire right or left side or partial areas on the right or left side.

According to an embodiment of the present invention, if a user uses a touch means, such as a finger or a touch pen, etc., to touch one of the adjustment areas 200 and 202 and move in a particular direction while maintaining contact, i.e. if the user provides a particular input to the user terminal, then the UI 100 can be reduced or magnified to the touch point of the touch means.

For example, if the user touches a particular point in the adjustment areas 200 and 202 and moves the touch means in a downward or a leftward direction while maintaining contact, the UI 100 can be represented in a reduced form near the touch point, and if the user moves the touch means in an upward or a rightward direction while maintaining contact, the UI 100 can be represented in a magnified form near the touch point. The reduction and magnification rates can be determined according to the distance moved by the touch means from the initial touch point. Of course, the direction for magnification/reduction can be set opposite to the above.

Also, the final position of the magnified or reduced UI can be determined according to the initial touch point or according to the final touch point. In cases where the position of the magnified or reduced UI is determined according to the final touch point, the UI can move while it is being magnified or reduced, as it follows the position of the touch means that moves while in contact with the user terminal.

Figure 3:
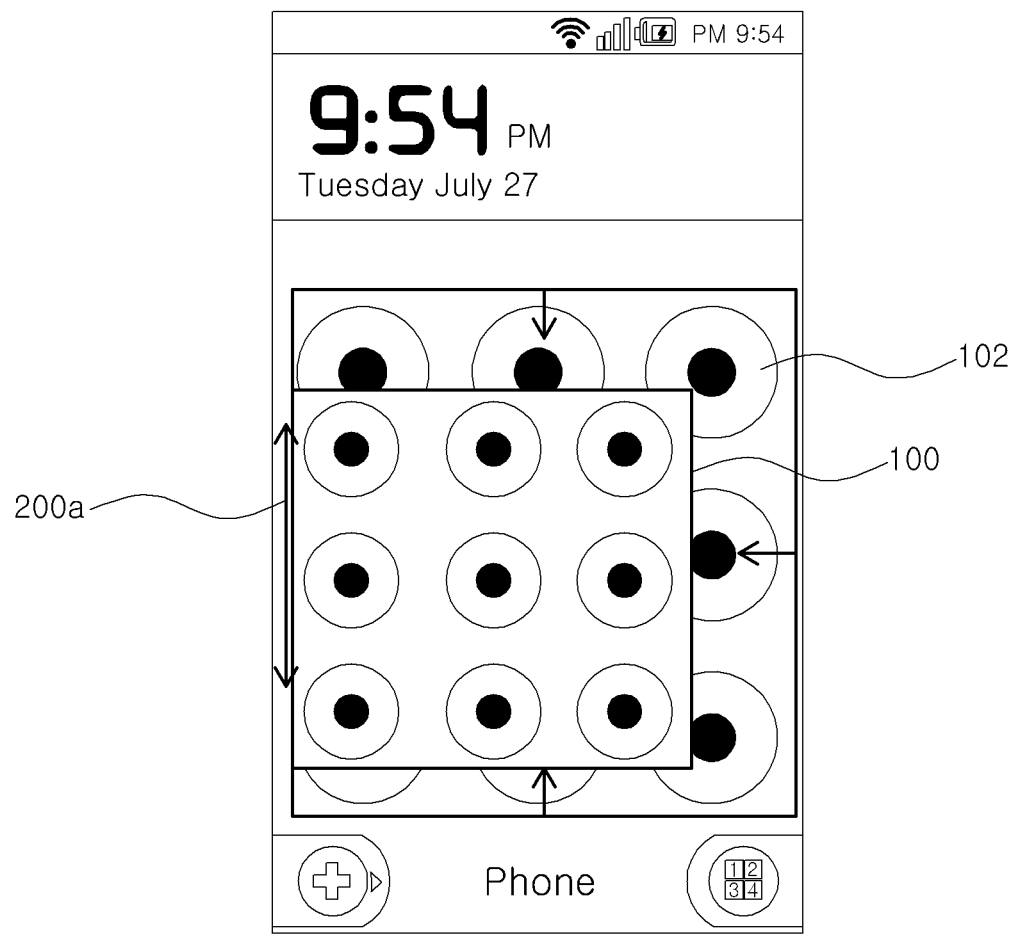

In one example, as illustrated in FIG. 3, if the touch means moves in a particular direction while touching a middle point of the left adjustment area 200a, then the UI 100 can be reduced to the middle left. Of course, although FIG. 3 illustrates a reduction as an example, it should be appreciated that reversing the arrows in FIG. 3 would represent a screen for magnification.

Figure 4:
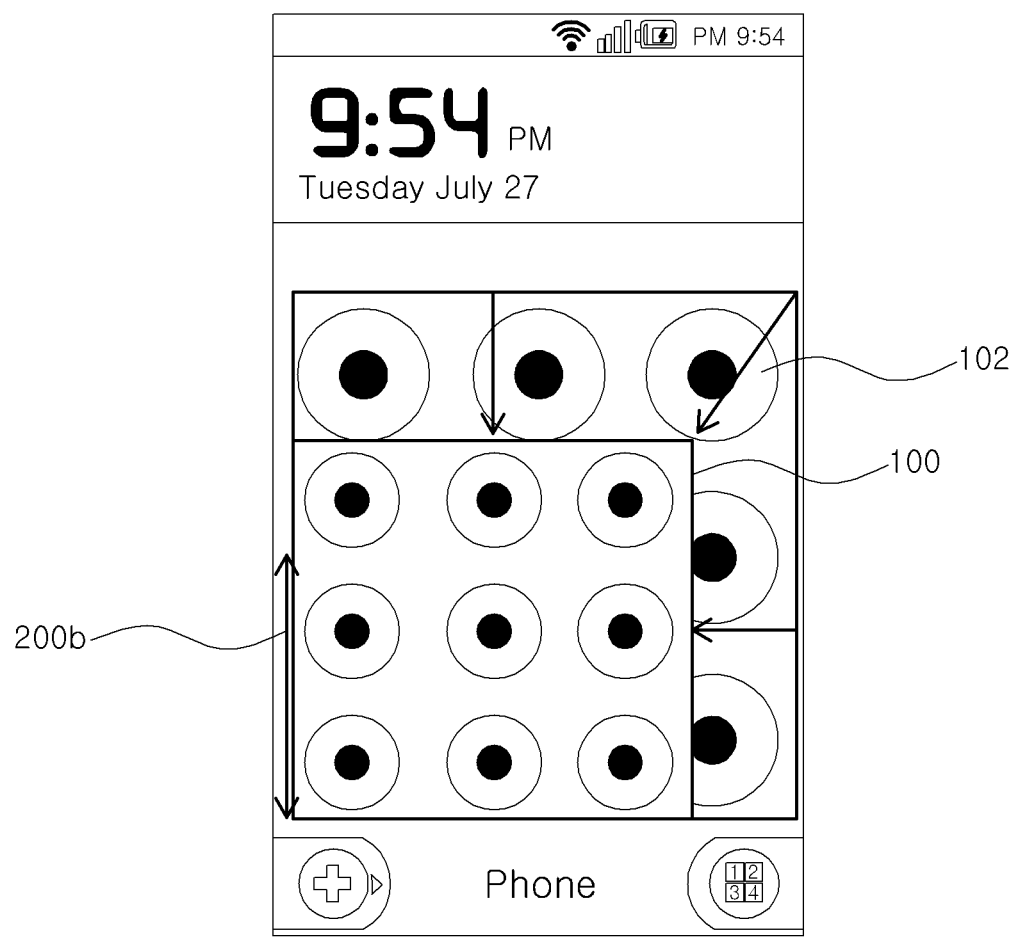

In another example, as illustrated in FIG. 4, if there is a movement in a particular direction while touching a lower point of the left adjustment area 200b, then the UI 100 can be reduced to the lower left.

Figure 5:
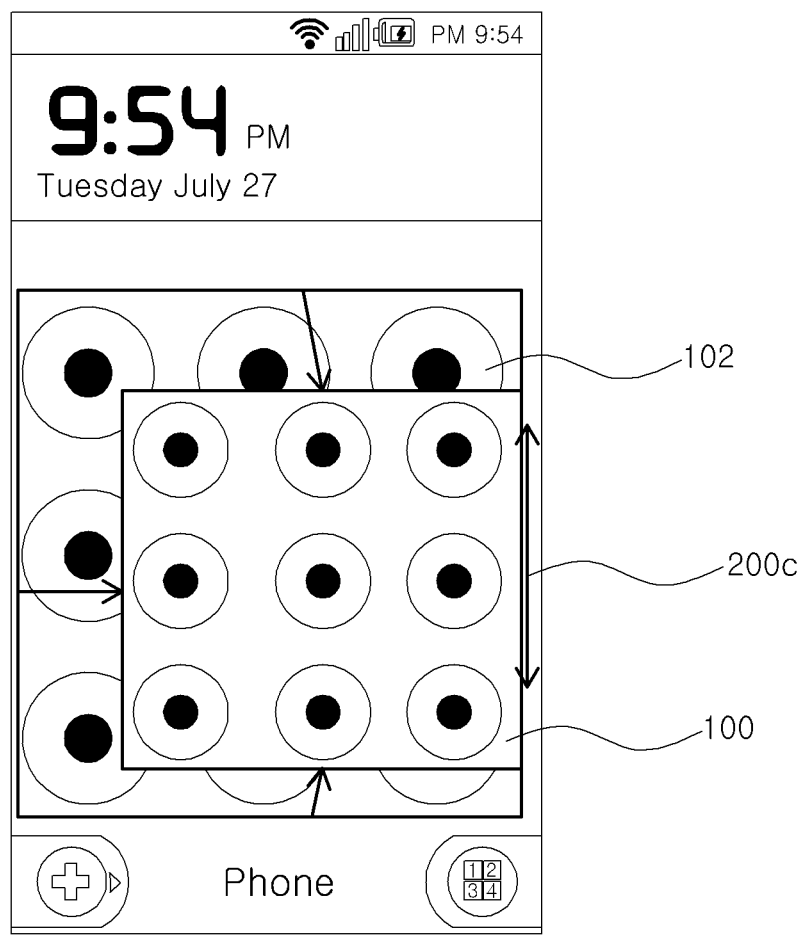

In yet another example, as illustrated in FIG. 5, if there is a movement in a particular direction while touching a middle point of the right adjustment area 200c, then the UI 100 can be reduced to the middle right.

Figure 6:
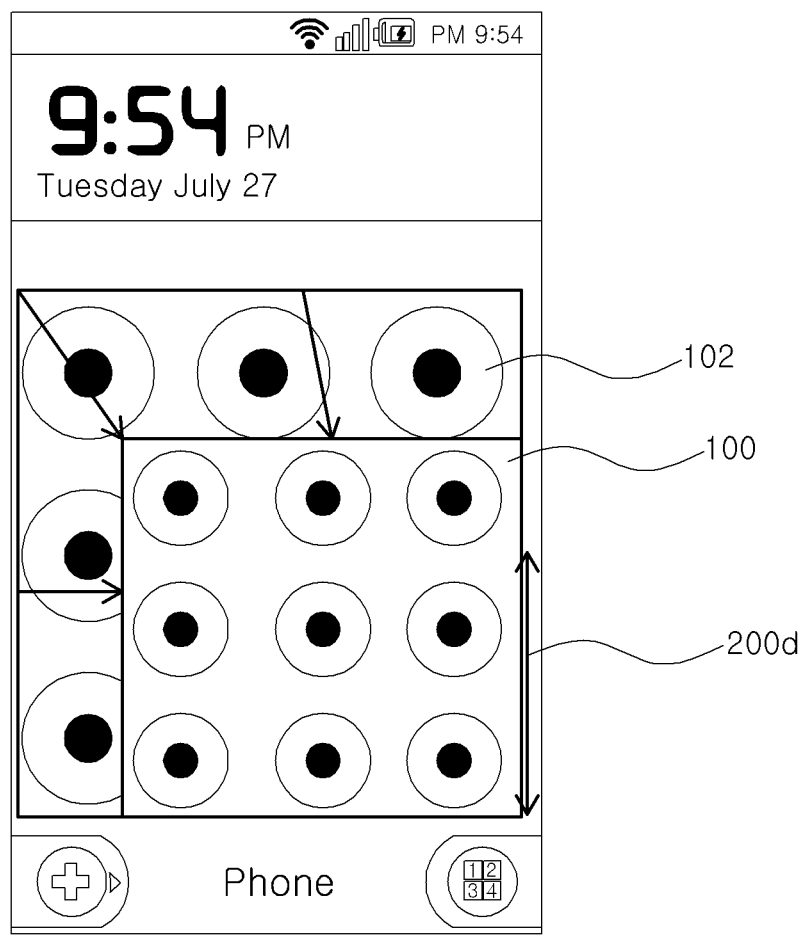

In still another example, as illustrated in FIG. 6, if there is a movement in a particular direction while touching a lower point of the left adjustment area 200b, then the UI 100 can be reduced to the lower right.

According to another embodiment of the present invention, if the user uses the touch means to touch a point on one of the adjustment areas 200 and 202 and then make a touch again, then the UI 100 can be magnified or reduced to the touched point, with the rate of magnification or reduction corresponding to the number of touches.

According to yet another embodiment of the present invention, if the user uses the touch means to touch a point on one of the adjustment areas 200 and 202, the UI 100 can begin its magnification or reduction to the touched point, and when the user releases the touch, the change in size of the UI 100 can be stopped. For example, when the user touches a portion of the adjustment areas 200 and 202, a reduction can begin, and when the user touches again, a magnification can begin. Thus, the user can select a magnification or reduction function by making a touch or a re-touch and control the duration of the pressing to magnify or reduce the UI 100 to a desired point in a desired proportion.

According to still another embodiment of the present invention, if the user moves the touch means to a particular point in relation to the touch point, the UI 100 can be magnified or reduced to the point at which the touch means is positioned last, where the rate of magnification or reduction can be determined according to the distance by which the touch means was moved.

According to another embodiment of the present invention, if the user uses the touch means to touch the adjustment area on an upper part of the screen of the user terminal and move to the left while maintaining contact, then the UI 100 can be magnified or reduced as it is moves to the left. Of course, if the user moves to the right while touching the adjustment area on the upper part of the screen of the user terminal, then the UI 100 can be magnified or reduced as it is moves to the right.

According to yet another embodiment of the present invention, if the user uses the touch means to touch the adjustment area on a lower part of the screen of the user terminal and move to the left while maintaining contact, then the UI 100 can be magnified or reduced as it is moves to the left. Of course, if the user moves to the right while touching the adjustment area on the lower part of the screen of the user terminal, then the UI 100 can be magnified or reduced as it is moves to the right.

In summary, a UI adjustment method based on this embodiment may use the touch point, to magnify or reduce the UI to or near the touch point. That is, the UI adjustment method according to an embodiment of the present invention may use the touch point in representing a magnified or reduced UI, where the position of the magnified or reduced UI may be determined according to the touch point of the touch means touching the adjustment area. Here, the touch point can include all points, from the initial touch point to the final touch point, and whether the UI is to be magnified or reduced can be determined according to the direction in which the touch means moves from the touch point of the touch means. Also, the rate of magnification or reduction can be determined by various methods based on the distance of a movement, the number of touches, the duration of a touch, etc.

Of course, the image of the UI being magnified or reduced can be displayed as is on the user terminal, or the magnified or reduced UI can be displayed on the screen without having the image of the magnification or reduction shown. Also, while it is described above that the UI may be changed to the point where the user made a touch, the direction of adjustment of the UI can also be fixed, irrespective of the user's touch point.

Although the above describes a size change and positional movement for one UI, it is also possible to change the size, position, or arrangement of multiple UI's.

While it is described above that the rate of magnification or reduction of a UI may vary according to the movement distance, etc., of the touch means, the rate of magnification or reduction can also be set initially to a fixed value. That is, if the user touches a portion of an adjustment area, the UI can be magnified or reduced to the touch point, but the rate of magnification or reduction can be fixed. Thus, even if the user moves the touch means, the rate of magnification or reduction can remain unchanged. However, when the touch means is moved, the UI can be magnified or reduced to the final touch point of the touch means.

Although it is not mentioned above, the beginning of the UI adjustment can be triggered as the user presses a particular button on the user terminal, selects a particular menu item, or issues a UI adjustment command by voice.

Also, while FIG. 1 to FIG. 6 illustrate a touch input method for adjusting the size of a UI that is similar to a method for adjusting a camera zoom, it is also possible to apply other methods. It is possible to have the screen increased if there is a prolonged touch on a particular area, such as the upper end portion of an arrow for example, and have the screen decreased if there is a prolonged touch on a lower end portion of the arrow.

When the screen size has been changed according to an embodiment of the present invention, the changed screen size can be applied for a particular UI only and for a single use. That is, the UI shown after the user decreases the pattern unlock screen and performs an unlock can be represented in its original size.

Also, if the user turns off the user terminal and turns it on again, the pattern unlock screen can be represented in its original size before the reduction. Of course, the settings can be configured such that the changed UI size always applies to all UI's.

When the user decreases the size of a UI on the user terminal and executes an application, the application can be executed in its original screen size.

Although it is not illustrated in the drawings, it would be apparent to those skilled in the art that an embodiment of the present invention can also be applied to adjust the size of photographs and web pages when viewing photographs stored in the user terminal or when surfing the web, particularly in situations where multiple touches cannot be made.

Figure 7A:
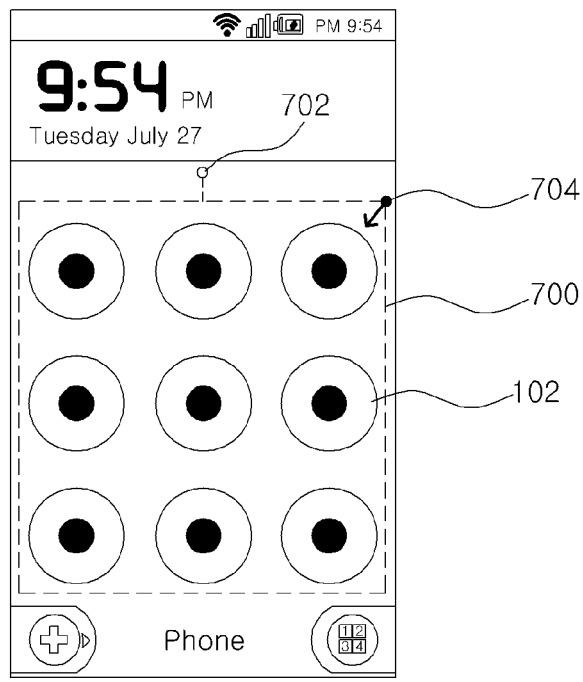
FIG. 7A and FIG. 7B illustrate a method of adjusting a UI according to a second embodiment of the present invention.
Figure 7B:
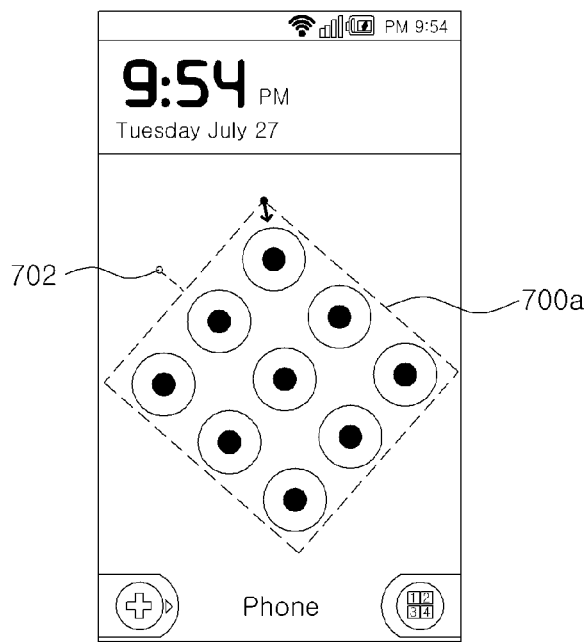

FIG. 7A and FIG. 7B illustrate a method of adjusting a UI according to a second embodiment of the present invention.

Referring to FIG. 7A, a UI 700 including unlock patterns 102 can be displayed on the screen of a user terminal.

When a user presses a particular button, etc., for adjusting the UI 700, an icon 702 can be shown that allows the adjusting of the UI 700.

In this situation, if the user touches a particular point, such as point 704 for example, and pulls towards an inner direction of the UI 700 while maintaining contact, then the UI 700 can be reduced in the direction of the pulling, and if the user touches and rotates the icon 702, then the UI 700 can be rotated, as illustrated in FIG. 7B.

In summary, the UI adjustment method of this embodiment can provide an icon 702 for adjusting the UI 700, to allow an adjustment of the size or position of the UI 700 by using the icon 702.

Of course, the UI 700 can also be made to rotate if the user touches a particular point on the UI 700 and moves in a rotating direction while maintaining contact, instead of using the icon 702 to rotate the UI 700.

That is, a UI adjustment method of this embodiment can adjust the size and position of a UI 700 and rotate the UI 700 to a desired direction.

Figure 8A:
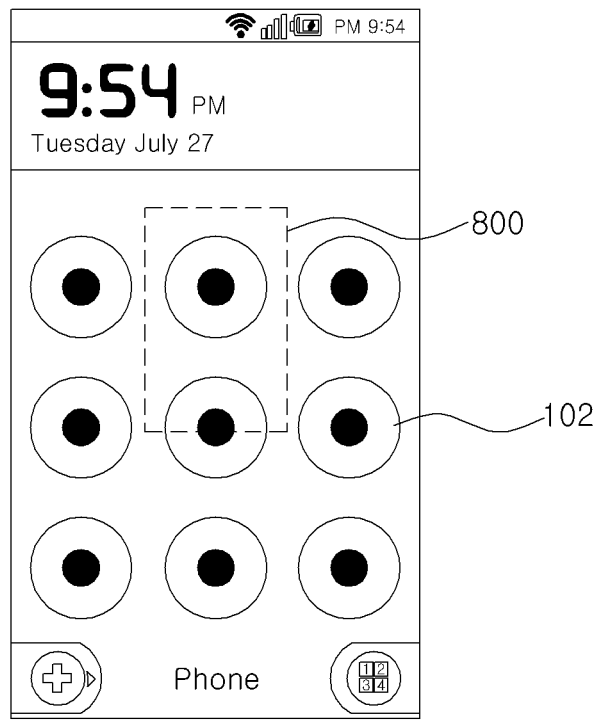
FIG. 8A and FIG. 8B illustrate a method of adjusting a UI according to a third embodiment of the present invention.
Figure 8B:
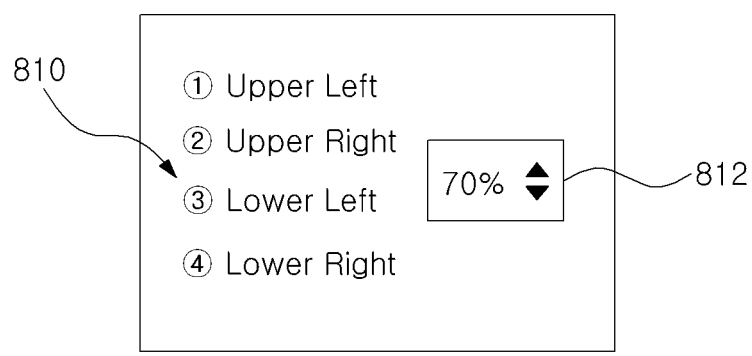

FIG. 8A and FIG. 8B illustrate a method of adjusting a UI according to a third embodiment of the present invention.

As illustrated in FIG. 8A, if the user presses a particular button, etc., then a menu 800 for adjusting the UI can be displayed on the screen of the user terminal.

The menu 800 can include a sub-menu 810 for adjusting the position of the UI and a sub-menu 812 for adjusting the size of the UI, as illustrated in FIG. 8B.

That is, the user can make a selection in the menu 800 to adjust the UI to a desired position and a desired size. Of course, the composition of the menu 800 can have many variations.

Calling the menu 800 and making a selection can also be performed by the user making a voice input, rather than pressing a button or making a touch input.

Figure 9:
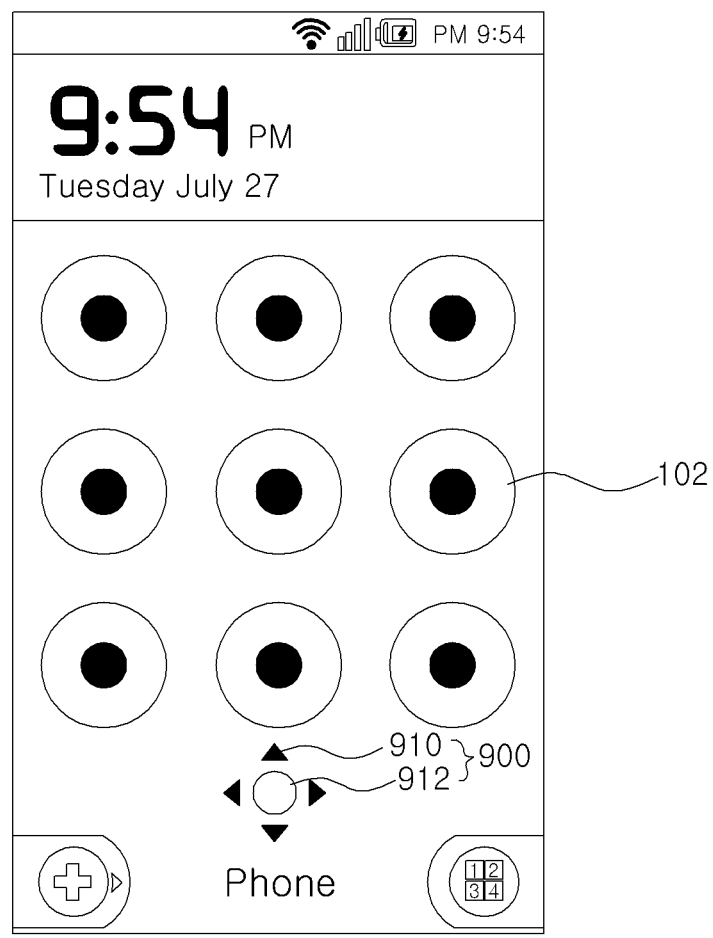
FIG. 9 illustrates a method of adjusting a UI according to a fourth embodiment of the present invention.

FIG. 9 illustrates a method of adjusting a UI according to a fourth embodiment of the present invention.

Referring to FIG. 9, an adjustment bar 900 can be displayed on a portion of the screen of the user terminal. Preferably, the adjustment bar 900 can be shown on a perimeter portion of a UI displayed on the screen of the user terminal.

The adjustment bar 900 can include a position adjustment bar 910 that adjusts the position of the UI and a size adjustment bar 912 that adjusts the size of the UI.

If the user selects an icon for a particular direction on the position adjustment bar 910, the UI can move in a corresponding direction, and the size of the UI can gradually be magnified or reduced according to the duration by which the size adjustment bar 912 is pressed. The selection of magnification or reduction can be changed in various ways, an example of which can involve recognizing a selection for the reduction function if the size adjustment bar 912 is touched an odd number of times and recognizing a selection for the magnification function if the size adjustment bar 912 is touched an even number of times.

Although the foregoing does not mention the adjustment bar 900 as being implemented with a rotation function, the adjustment bar 900 can further include a rotation adjustment bar for implementing such rotation function.

According to another embodiment of the present invention, the adjustment bar 900 can include only the position adjustment bar 910. For example, if the user selects an icon for a particular direction on the position adjustment bar 910, the UI can be moved left, right, up or down, and the UI size can be reduced or magnified in a fixed rate.

According to still another embodiment of the present invention, the adjustment bar 900 can include only the size adjustment bar 912. For example, if the user uses the size adjustment bar 912 to adjust the size, the UI can be automatically moved to a preset fixed position.

According to yet another embodiment of the present invention, the adjustment bar 900 itself can be positioned biased to the left or to the right, to allow the user easier use with one hand.

Figure 10:
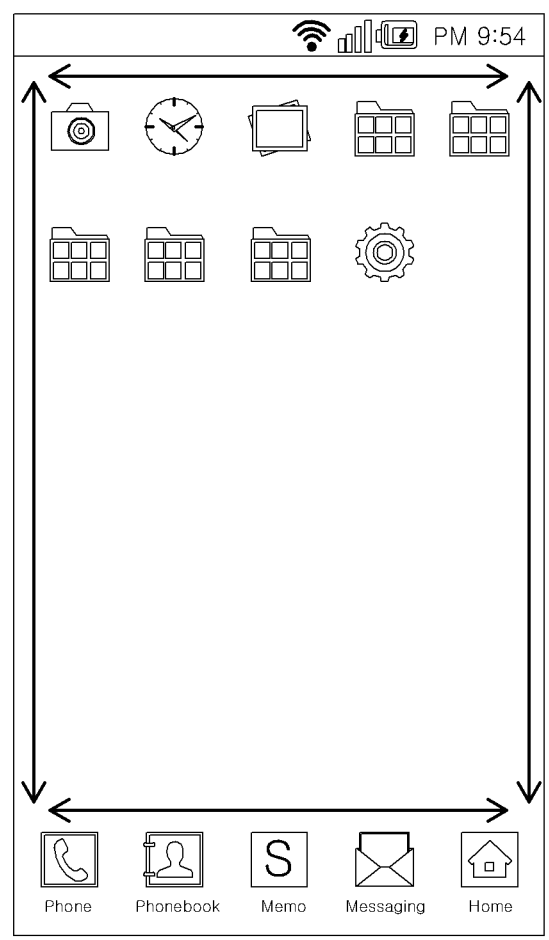
FIG. 10 illustrates a UI screen according to another embodiment of the present invention.

FIG. 10 illustrates a UI screen according to another embodiment of the present invention.

While unlock patterns are illustrated as an example a UI in FIG. 1 to FIG. 9, the UI can include icons, at least one widget, a screen including widgets, etc., as illustrated in FIG. 10.

In the case of icons, widgets, etc., such as those illustrated in FIG. 10, the UI can be a widget screen showing widgets, and the size, position, or rotation of the widget screen as a UI can be adjusted. Here, the widget screen as a UI refers only to the area within the adjustment area represented by arrows in FIG. 10, and the top area showing the battery indicator icon, etc., and the bottom area showing the home icon, etc., may not be included in the UI for the purposes of the present invention.

The features described with reference to FIG. 1 through FIG. 9 are also applicable to the UI of FIG. 10. Also, the features described with reference to FIG. 10 and described subsequently are also applicable to the UI of FIG. 1 through FIG. 9.

According to another embodiment of the present invention, in addition to the UI within the adjustment area, the top area showing the battery indicator icon, etc., and the bottom area showing the home icon, etc., as well as the icons, etc., within these areas can also be adjusted in position or size.

Figure 11A:
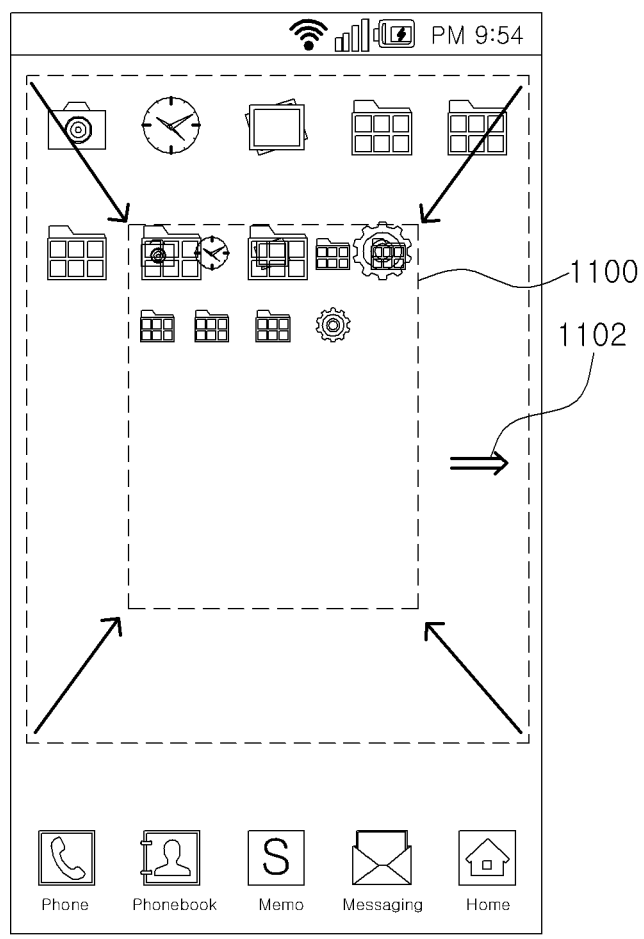
FIG. 11A and FIG. 11B illustrate a method of adjusting a UI according to a fifth embodiment of the present invention.
Figure 11B:
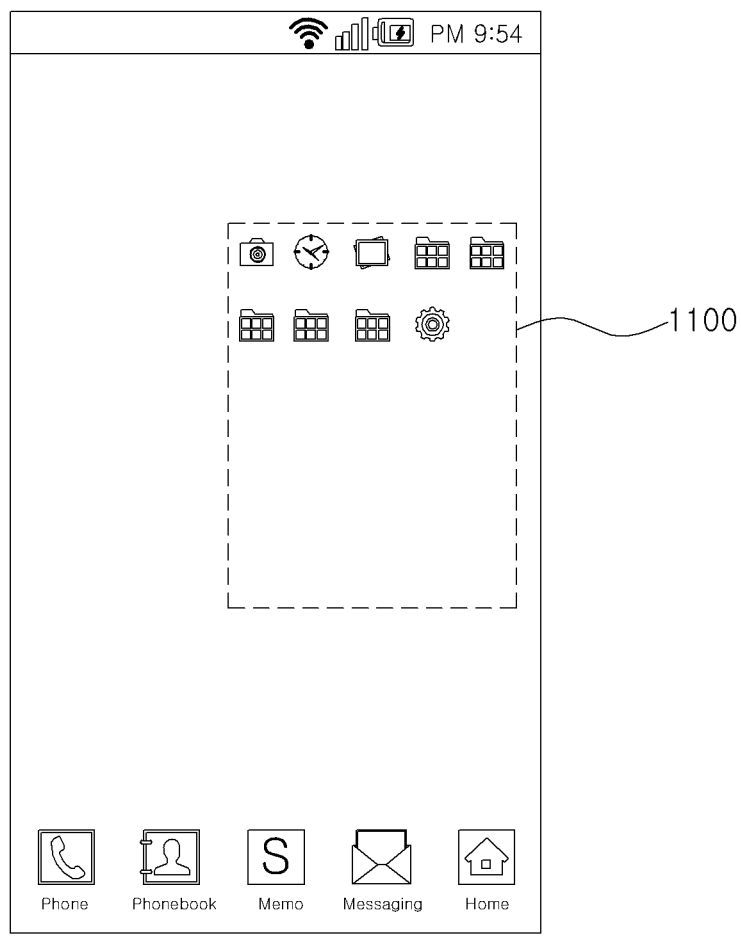

FIG. 11A and FIG. 11B illustrate a method of adjusting a UI according to a fifth embodiment of the present invention.

As illustrated in FIG. 11A, if the user shakes the user terminal left and right or up and down, the UI 1100 can be reduced or magnified during the shaking, and if the user, while shaking the user terminal left and right or up and down, stops after moving the user terminal in a particular direction, such as direction 1102 for example, then the reduced or magnified UI 1100 can be positioned in said particular direction, as illustrated in FIG. 11B.

That is, the user can use a shaking method to adjust the size of the UI 100 and move the position of the UI 100, without having to press a button on the user terminal or manipulate a touch screen. By using this method, the position and size, etc., of the UI 100 can be adjusted with just one hand, making it considerably convenient for the user who is on a bus, etc.

According to another embodiment of the present invention, the magnification or reduction of the UI 1100 can be determined according to the direction in which the user terminal is shaken. For example, if the user shakes the user terminal left and right, the UI 1100 can be reduced, and if the user shakes the user terminal up and down, the UI 1100 can be magnified.

In summary, a UI adjustment method of this embodiment can employ a method of shaking the user terminal to adjust the position and size, etc., of the UI. Of course, it is possible for the UI adjustment method to rotate the UI as well.

Figure 12A:
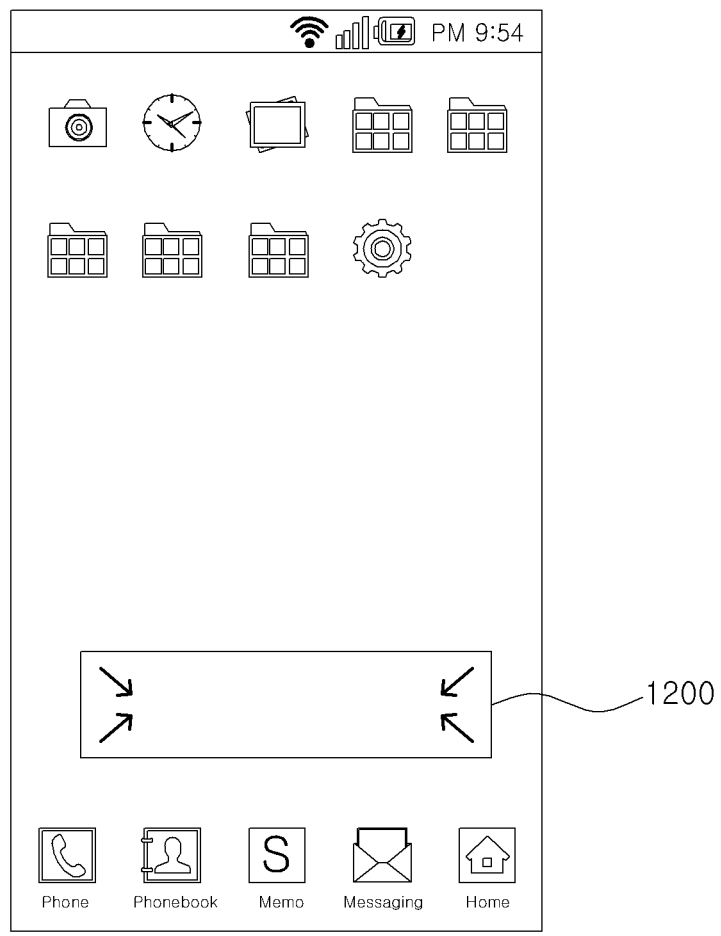
FIG. 12A and FIG. 12B illustrate a method of adjusting a UI according to a sixth embodiment of the present invention.
Figure 12B:
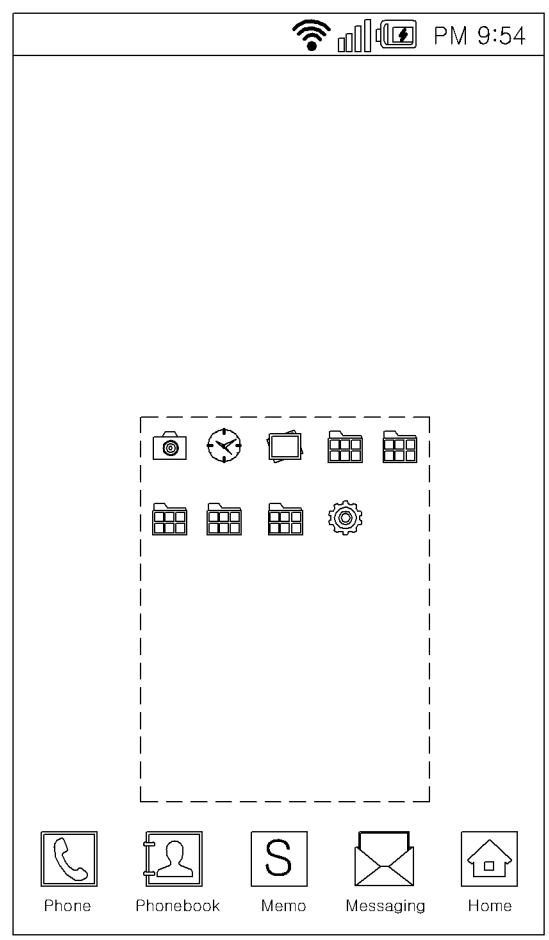

FIG. 12A and FIG. 12B illustrate a method of adjusting a UI according to a sixth embodiment of the present invention.

Referring to FIG. 12A, an adjustment part 1200 can be displayed on a portion of the screen of the user terminal.

The adjustment part 1200 may recognize a touch input by the user, and the user can move a touch means in a particular direction while maintaining contact in the adjustment part 1200 to magnify or reduce the UI in the touched direction, as illustrated in FIG. 12B.

According to another embodiment of the present invention, the user terminal not only can adjust the UI but also can adjust the position, etc., of the adjustment part 1200.

Figure 13A:
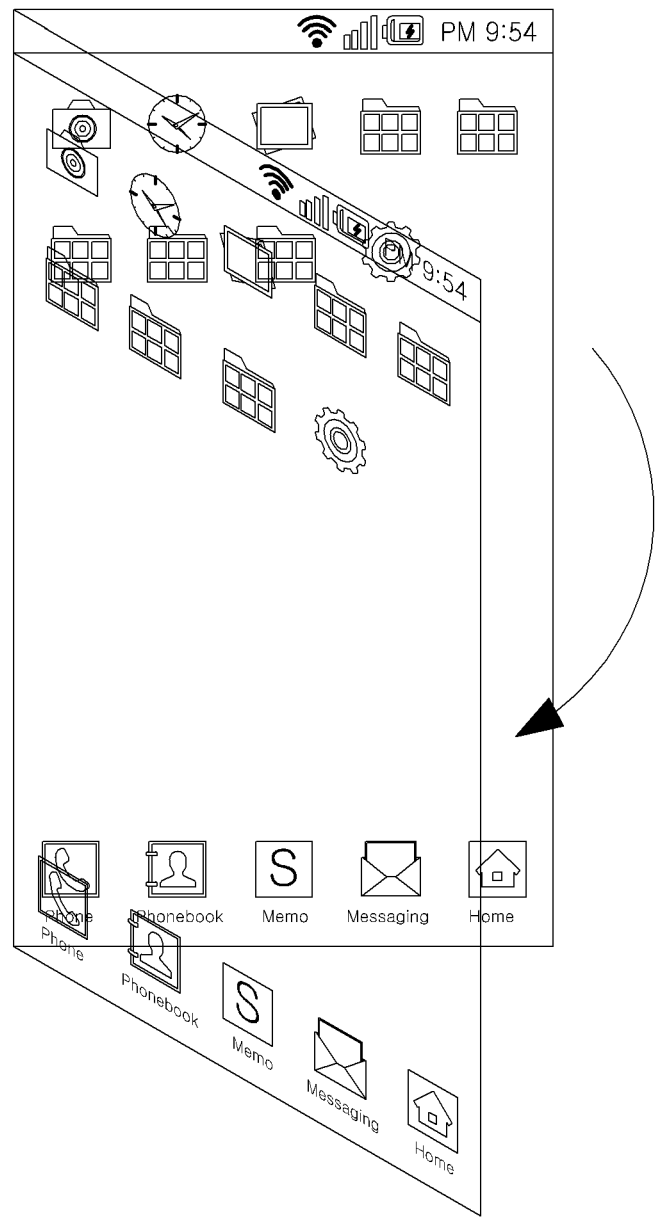
FIG. 13A and FIG. 13B illustrate a method of adjusting a UI according to a seventh embodiment of the present invention.
Figure 13B:
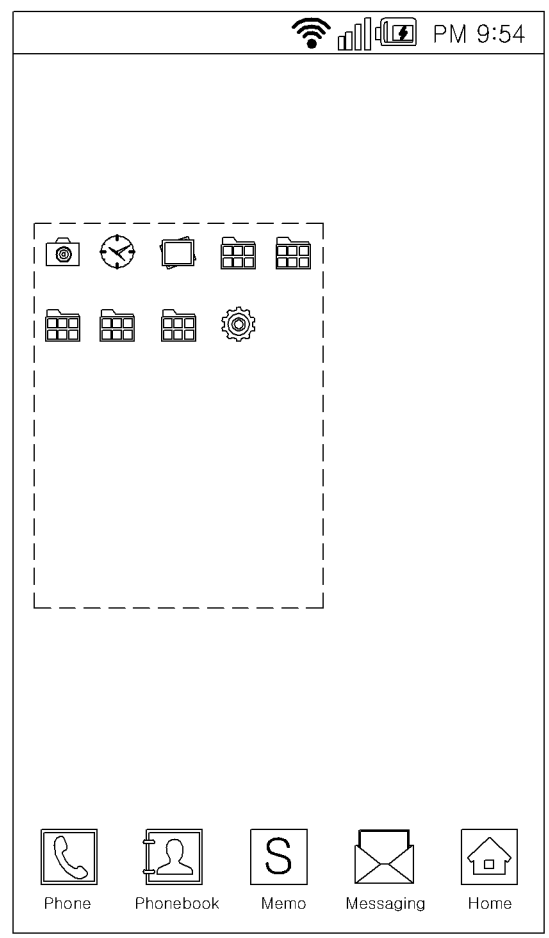

FIG. 13A and FIG. 13B illustrate a method of adjusting a UI according to a seventh embodiment of the present invention.

If the user terminal is tilted in a particular direction, as illustrated in FIG. 13A, then the UI can be moved in the tilted direction, as illustrated in FIG. 13B. Also, the size of the UI can be magnified or reduced, where the rate of magnification or reduction can be set beforehand. That is, the UI may be magnified or reduced in the direction in which the user terminal is tilted, and the position of the magnified or reduced UI may be determined according to the direction in which the user terminal is tilted.

For example, the user terminal can be tilted left, right, up, or down from an orientation in which the display unit of the user terminal faces the sky, or can be tilted left, right, or up from an orientation in which the user terminal stands upright. In such cases, the UI can be magnified or reduced towards the tilting side.

The tilted state of the user terminal can be detected by a sensor, for which the user terminal can include a gyroscope sensor for example. As the gyroscope sensor detects the tilting direction of the user terminal, the position and size of the UI can be adjusted. That is, if the user terminal is tilted to the left, as illustrated in FIG. 13, the UI can be moved left while being reduced in a leftward direction. Although it is not illustrated in the drawings, the user terminal can be moved right while being reduced in a rightward direction if the user terminal is tilted to the right. In other embodiments, the position of the magnified or reduced UI can be set differently according to the tilting direction of the user terminal.

Figure 14:
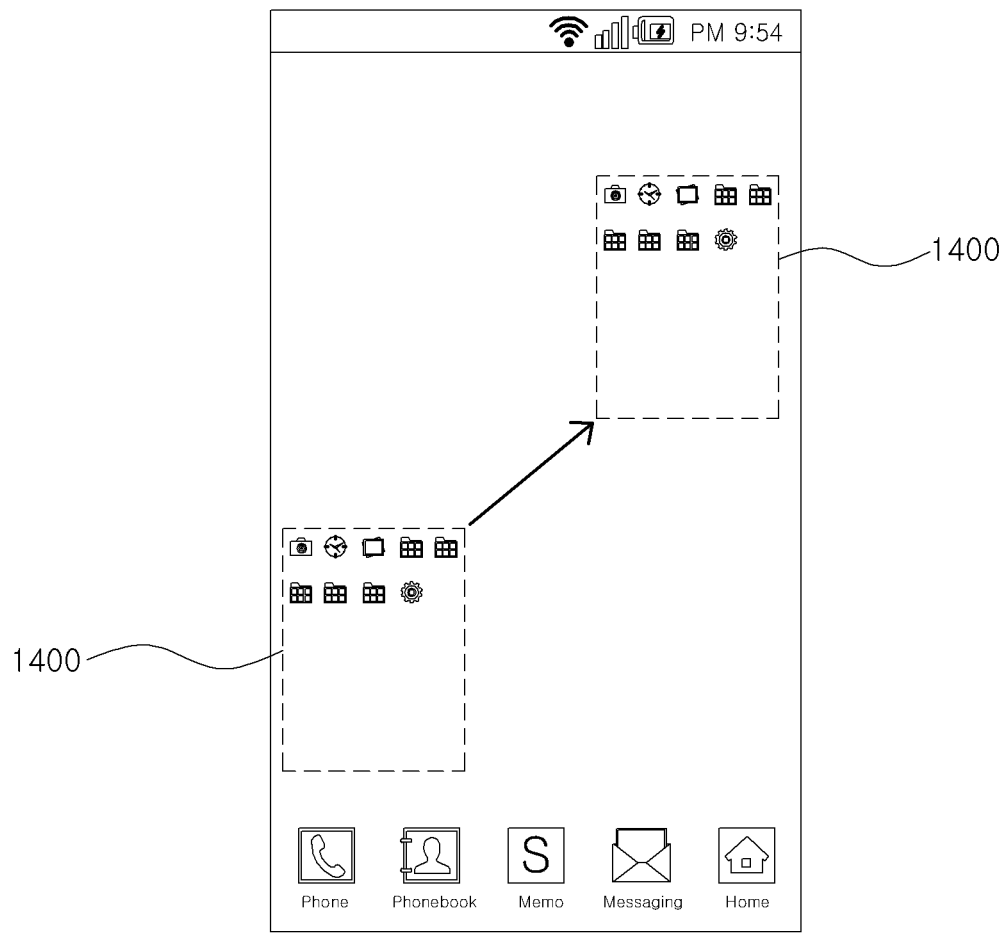
FIG. 14 illustrates a method of adjusting a UI according to an eighth embodiment of the present invention.

FIG. 14 illustrates a method of adjusting a UI according to an eighth embodiment of the present invention.

As illustrated in FIG. 14, the user can move the position of a UI, of which the size, etc., has been adjusted, on the user terminal by using a touch means.

According to another embodiment of the present invention after the UI 1400 has been adjusted, the adjusted UI 1400 can be moved according to the direction in which the user shakes the user terminal.

Figure 15:
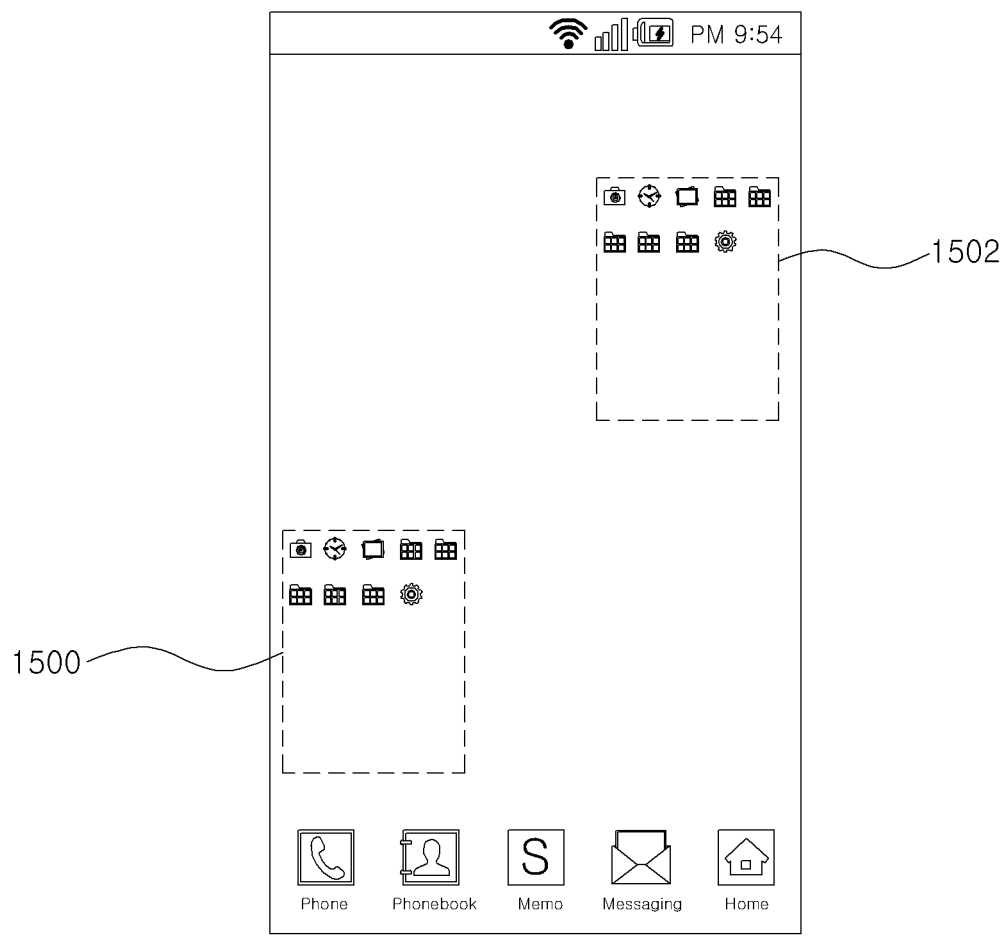
FIG. 15 illustrates a method of adjusting a UI according to a ninth embodiment of the present invention.

FIG. 15 illustrates a method of adjusting a UI according to a ninth embodiment of the present invention.

As illustrated in FIG. 15, the user can copy a UI 1500 to create a UI copy 1502. By such copying, the UI's 1500 and 1502 may be present in multiple positions, so that the user can select a desired icon, etc., anywhere with one hand.

Figure 16A:
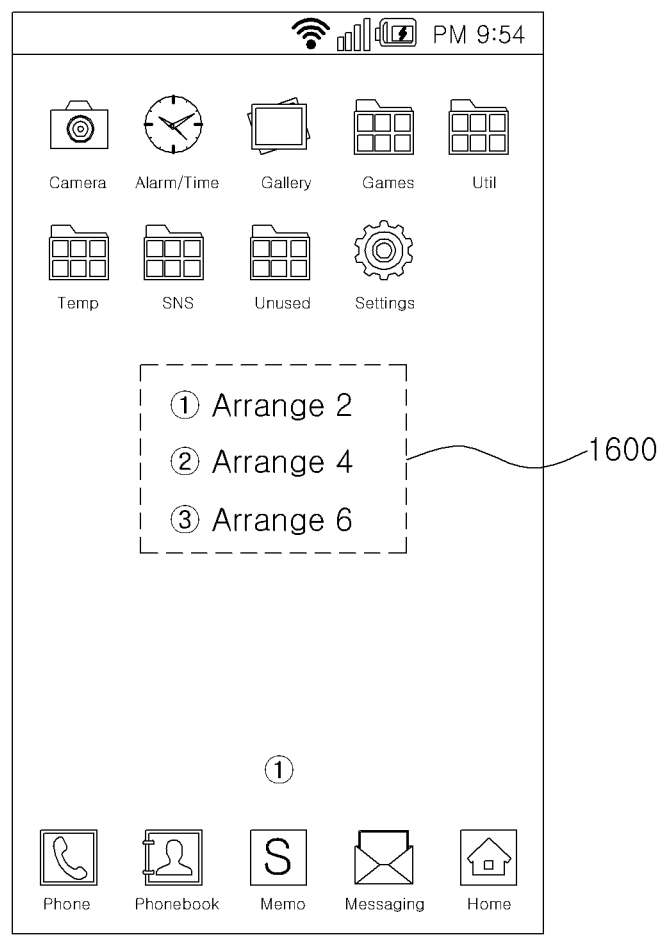
FIG. 16A and FIG. 16B illustrate a method of adjusting a UI according to a tenth embodiment of the present invention.
Figure 16B:
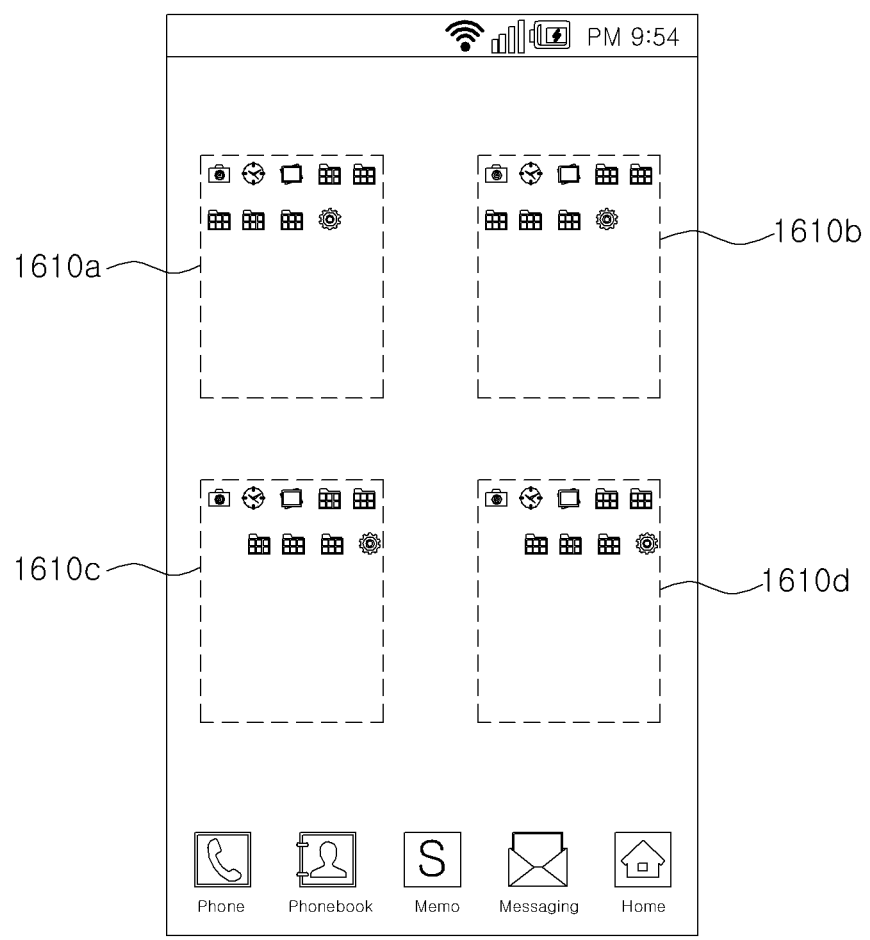

FIG. 16A and FIG. 16B illustrate a method of adjusting a UI according to a tenth embodiment of the present invention.

As illustrated in FIG. 16A and FIG. 16B, a menu 1600 can be represented on the screen of the user terminal, and if the user selects a particular menu item, the UI 1610 can be arranged on the screen in a corresponding number. Of course, the position and the rate of magnification or reduction can be set beforehand for each number of UI's 1610.

Figure 17:
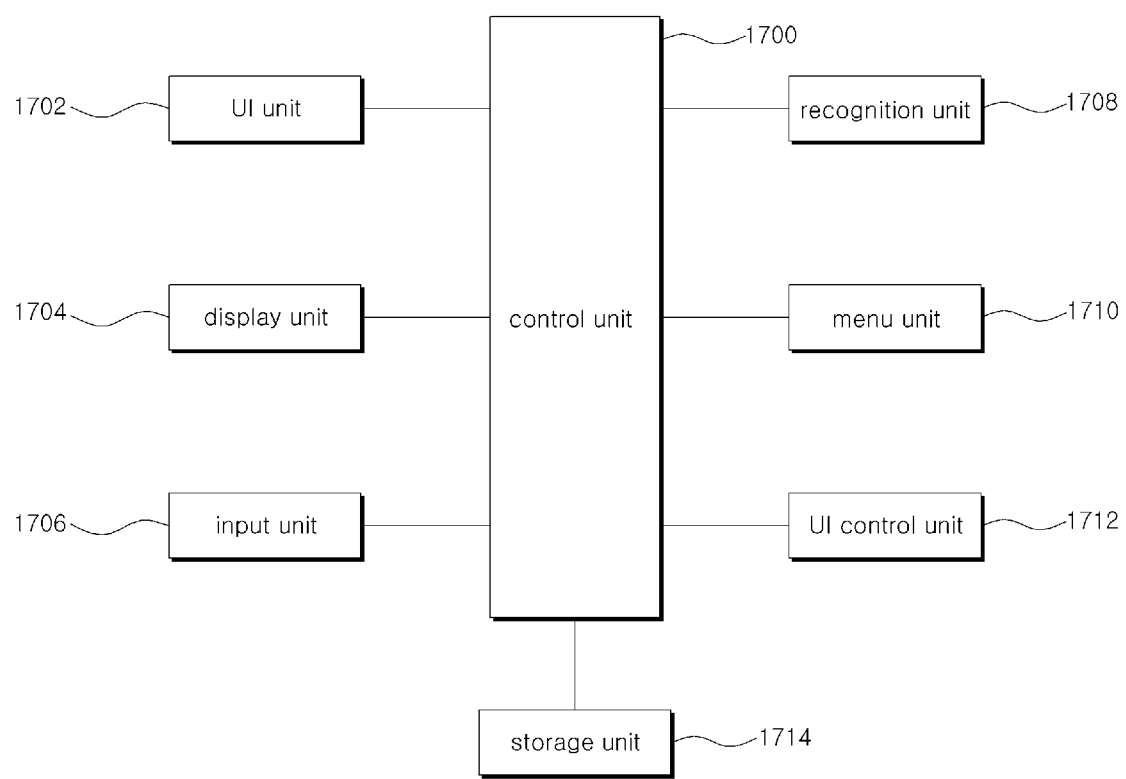
FIG. 17 is a block diagram illustrating a user terminal according to an embodiment of the present invention.

FIG. 17 is a block diagram illustrating a user terminal according to an embodiment of the present invention.

Referring to FIG. 17, a user terminal can include a control unit 1700, a UI unit 1702, a display unit 1704, an input unit 1706, a recognition unit 1708, a menu unit 1710, a UI control unit 1712, and a storage unit 1714. The UI adjustment methods described above with reference to FIG. 1 to FIG. 16 can be applied to the user terminal illustrated in FIG. 17, and other embodiments can have additional or omitted components with respect to FIG. 17.

The UI unit 1702 may display a UI, such as an unlock pattern, widget, icon, etc., or manage a displayed UI. Here, the UI can be a pattern unlock UI or a UI representing one or more application icons, or an entity, a group of multiple entities, or an entity screen showing at least one entity.

The display unit 1704 may serve to display images, etc., and can be an OLED, LCD, PDP, etc., not being limited to a particular type.

The input unit 1706 may serve to receive the user's input.

The recognition unit 1708 may recognize the user's input and extract the user's command.

The menu unit 1710 may manage a menu that is to be shown on the display unit 1704, a menu for managing the UI, and the like.

The UI control unit 1712 may adjust and manage the size, position, arrangement (rotation), etc., of a UI according to the user command corresponding to the user's input.

According to an embodiment of the present invention, the UI control unit 1712 can show a UI after moving the magnified or reduced UI to the direction of a point at which the touch means made contact in an adjustment area on the display unit 1704 or, if the touch means was moved, the direction of the point at which the touch means was positioned last. That is, the position of the magnified or reduced UI may be determined according to the touch point of the touch means touching the adjustment area, and the UI control unit 1712 may magnify or reduce the UI in a direction towards a position corresponding to user input.

Here, the rate of magnification or the rate of reduction of the UI can be determined in accordance with the movement distance of the touch means, and the magnification or reduction of the UI can be determined in accordance with the direction in which the touch means was moved from the touch point of the touch means. Also, the adjustment area can be positioned in a perimeter portion of the UI and can be positioned within a preset distance from the bezel of the user terminal.

According to another embodiment of the present invention, the UI control unit 1712 can show the UI after moving the magnified or reduced UI in a direction towards a position corresponding to user input.

According to yet another embodiment of the present invention, the UI control unit 1712 can show the UI after moving the magnified or reduced UI in a direction in which the user terminal is tilted.

According to still another embodiment of the present invention, an adjustment part capable of touch recognition can be displayed on a portion of the screen of the display unit 1704, and the UI control unit 1712 can adjust at least one of the position, size, and arrangement of the UI in accordance with the input of the touch means touching the adjustment part.

According to yet another embodiment of the present invention, a multiple number of adjustment icons can be shown in a perimeter portion of the screen of the display unit 1704. For example, there can be three adjustment icons each on the top portion and bottom portion of the display unit 1704, with one adjustment icon on the middle left and one adjustment icon on the middle right. If the user selects a particular adjustment icon, the UI control unit 1712 can change the position of the UI to or near to the position of the selected adjustment icon, and the UI can be magnified or reduced to a preset size. Also, it is possible to allow the user to arbitrarily set the number, arrangement position, and form of the adjustment icons.

According to another embodiment of the present invention, the UI control unit 1704 can display on the display unit 1704 a second UI having the same function as a first UI that is displayed on the display unit 1704 but having a different position, size, or arrangement. Here, the first UI and the second UI can be displayed simultaneously or can be shown individually at different times.

According to yet another embodiment of the present invention, if the user terminal is rebooted while the second UI is being displayed, a first UI having a different size from that of the second UI can be displayed on the display unit 1704. Here, the first UI can have a size that was set initially on the user terminal.

According to still another embodiment of the present invention, when switching to another screen while the second UI is being displayed, a third UI can be shown on the switched screen in the size initially set on the user terminal, irrespective of the rate of magnification or reduction of the second UI.

The storage unit 1714 may store various data.

The control unit 1700 may control the overall operations of the components of the user terminal.

The technical features described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the present invention, and vice versa.

The embodiments of the present invention described above are provided for illustrative purposes. It should be understood that a person having ordinary skill in the art would be able to make various modifications, alterations, and additions without departing from the spirit and scope of the present invention, and that such modifications, alterations, and additions are encompassed by the scope of claims set forth below.

What is claimed is:

1. A method of adjusting a user interface (UI) on a user terminal, the method comprising:
    displaying a UI on a display unit of a user terminal, wherein the display unit includes a screen that defines a screen size;
    wherein the UI includes an upper area displaying status information pertaining to the user terminal, wherein the status information includes an indication of battery charge, and a lower area displaying a plurality of selectable input receiving units; wherein the plurality of selectable input receiving units comprises one or more software applications represented by graphical icons; wherein a size of the upper area and lower area in relation to the UI defines a ratio;
    wherein the UI and the screen size are initially substantially equal in size, thereby defining an initial UI size;
    receiving a first touch event;
    resizing the UI into a reduced form to define a reduced UI according to the first touch event, wherein the reduced UI is smaller than the screen size and wherein a difference in area between the reduced UI and the screen size defines a space;
    wherein the reduced UI defines a smaller upper area and a smaller lower area, wherein a size of the smaller upper area and smaller lower area in relation to the reduced UI substantially maintains the ratio;
    wherein the space excludes the smaller upper area and smaller lower area;
    executing an application within the reduced UI when the application is requested to be executed by a user while the reduced UI is being displayed;
    receiving a second touch event;
    resizing the reduced UI into an enlarged UI according to the second touch event, wherein the enlarged UI is larger than the reduced UI; wherein the enlarged UI defines an enlarged upper area and enlarged lower area; and
    wherein a size of the enlarged upper area and enlarged lower area in relation to the enlarged UI maintains the ratio.

2. The method of claim 1, wherein the reduced UI is displayed on a left side, a lower left side, a right side, or a lower right side of the display unit.

3. The method of claim 1, wherein executing an application within the reduced UI further comprises displaying the application solely within the UI.

4. The method of claim 1, further comprising receiving a third touch event; shifting the reduced UI to a position that is adjacent to a left side of the display unit in accordance with the third touch event.

5. The method of claim 1, further comprising receiving a third touch event; shifting the reduced UI to a position that is adjacent to a right side of the display unit in accordance with the third touch event.

6. The method of claim 1, further comprising receiving a third touch event; shifting the enlarged UI to a position that is adjacent to a left side of the display unit in accordance with the third touch event.

7. The method of claim 1, further comprising receiving a third touch event; shifting the enlarged UI to a position that is adjacent to a right side of the display unit in accordance with the third touch event.

8. The method of claim 1, further comprising executing an application within the enlarged UI.

9. The method of claim 1, further comprising receiving a fourth touch event; resizing the reduced UI to the initial UI size in accordance with the fourth touch event.

10. The method of claim 1, further comprising receiving a fourth touch event; resizing the enlarged UI to the initial UI size in accordance with the fourth touch event.

11. A system for adjusting a user interface (UI) on a user terminal, wherein the user terminal comprises:
    a display unit, wherein the display unit includes a screen that defines a screen size and wherein the display unit is configured to display the UI;
    a control unit;
    a UI control unit;
    an input unit;
    wherein the UI includes an upper area displaying status information pertaining to the user terminal, wherein the status information includes an indication of battery charge, and a lower area displaying a plurality of selectable input receiving units; wherein the plurality of selectable input receiving units comprises one or more software applications represented by graphical icons; wherein a size of the upper area and lower area in relation to the UI defines a ratio;
    wherein the UI and the screen size are initially substantially equal in size, thereby defining an initial UI size;
    wherein the input unit is configured to receive a first touch event, wherein in response to the first touch event, the UI control unit is configured to resize the UI into a reduced form to define a reduced UI, wherein the reduced UI is smaller than the screen size and wherein a difference in area between the reduced UI and the screen size defines a space;
    wherein the reduced UI defines a smaller upper area and a smaller lower area, wherein a size of the smaller upper area and smaller lower area in relation to the reduced UI substantially maintains the ratio;
    wherein the space excludes the smaller upper area and smaller lower area;
    wherein the control unit is configured to execute an application within the reduced UI;
    wherein the input unit is configured to receive a second touch event, wherein in response to the second touch event, the UI control unit is configured to resize the reduced UI into an enlarged UI, wherein the enlarged UI is larger than the reduced UI; wherein the enlarged UI defines an enlarged upper area and enlarged lower area; and wherein a size of the enlarged upper area and enlarged lower area in relation to the enlarged UI maintains the ratio.

12. The system of claim 11, wherein the control unit is configured to display applications that are launched within the UI solely within the UI.

13. The system of claim 11, wherein the display unit is configured to display the reduced UI on a left side, a lower left side, a right side, or a lower right side of the display unit.

14. The system of claim 11, wherein the input unit is configured to receive a third touch event, wherein in response to the third touch event, the UI control unit is configured to shift the reduced UI to a position that is adjacent to a left side of the display unit.

15. The system of claim 11, wherein the input unit is configured to receive a third touch event, wherein in response to the third touch event, the UI control unit is configured to shift the reduced UI to a position that is adjacent to a right side of the display unit.

16. The system of claim 11, wherein the input unit is configured to receive a third touch event, wherein in response to the third touch event, the UI control unit is configured to shift the enlarged UI to a position that is adjacent to a left side of the display unit.

17. The system of claim 11, wherein the input unit is configured to receive a third touch event, wherein in response to the third touch event, the UI control unit is configured to shift the enlarged UI to a position that is adjacent to a right side of the display unit.

18. The system of claim 11, wherein the control unit is configured to execute an application within the enlarged UI.

19. The system of claim 11, wherein the input unit is configured to receive a fourth touch event, wherein in response to the fourth touch event, the UI control unit is configured to resize the reduced UI to the initial UI size.

20. The system of claim 11, wherein the input unit is configured to receive a fourth touch event, wherein in response to the fourth touch event, the UI control unit is configured to resize the enlarged UI to the initial UI size.

* * * * *